*Henry M. Hartshorn's Improved Folding Lamp Shade.*

75418

PATENTED
MAR 10 1868

Witnesses
S. N. Piper
J. R. Snow

H. M. Hartshorn
by his attorney
R. H. Eddy

United States Patent Office.

HENRY M. HARTSHORN, OF MALDEN, ASSIGNOR TO HIMSELF AND DANIEL FOBES, OF BOSTON, MASSACHUSETTS.

*Letters Patent No. 75,418, dated March 10, 1868.*

IMPROVEMENT IN LAMP-SHADES.

*The Schedule referred to in these Letters Patent and making part of the same.*

TO ALL PEPSONS TO WHOM THESE PRESENTS MAY COME:

Be it known that I, HENRY M. HARTSHORN, of Malden, in the county of Middlesex, and State of Massachusetts, have invented a new and useful or improved Folding Lamp-Shade; and I do hereby declare the same to be fully described in the following specification, and represented in the accompanying drawings, of which—

Figure 1:
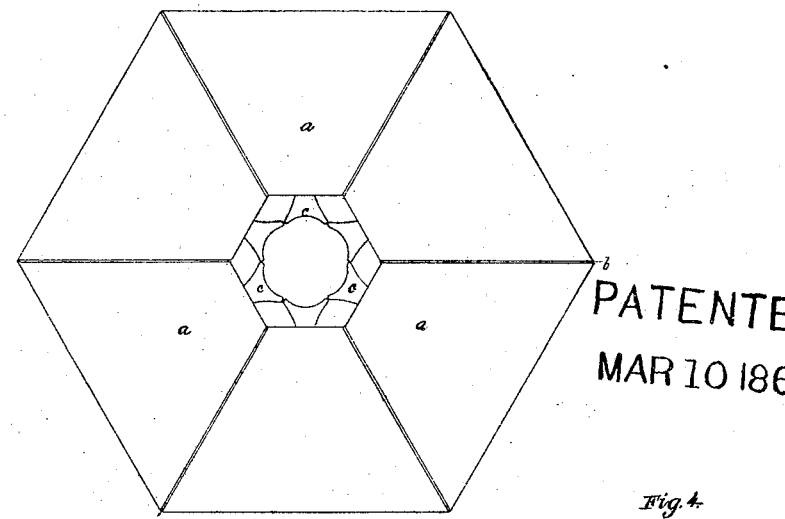

Figure 1 is a top view, and

Figure 2:
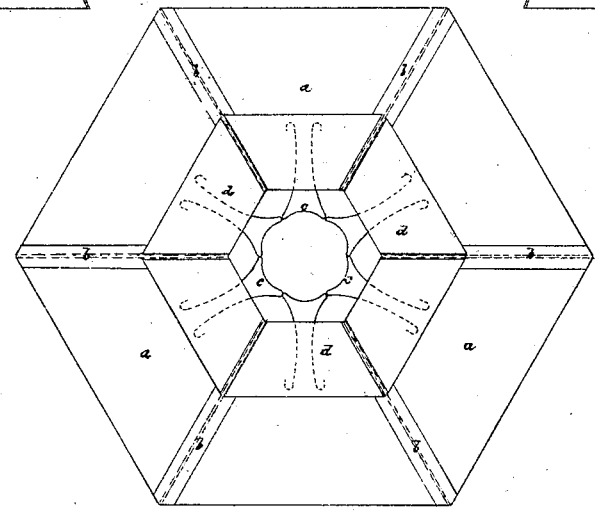

Figure 2 a bottom view of a shade as unfolded or open and ready for use on a lamp-chimney.

Figure 3:
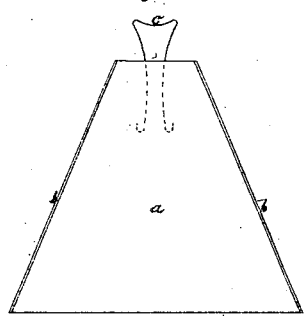

Figure 3 is a side view of it in a folded state.

Figure 4:
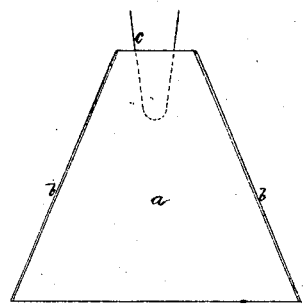

It is composed of a series of trapezoids, $a\ a\ a$, of paper, arranged edge to edge, each being connected to that next to it by a strip of cloth, $b$, cemented to both so as to form a hinge or flexile connection, such as will enable one section to be turned down flat upon the other, and the whole to be folded into the form shown in fig. 3. There is a series of supporters, $c\ c\ c$, made of wire, projecting from the shorter bases of the several trapezoidal sections, there being one of such supporters to each of the sections. Each of the said supporters may have the form as shown in figs. 1 and 2, or it may be formed and arranged with the section in manner as shown in Figure 4, in which it is partially exhibited in dotted lines. It is also shown in figs. 1 and 2, it being held in place by a layer of cloth, $d$, pasted on it and the inner surface of the trapezoidal section.

When the shade is applied to a tapering lamp-chimney, the upper parts of the supporters encompass and rest on the chimney, and thereby support the shade in place about the flame of the lamp.

I claim as my invention the folding shade made of trapezoids, connected at their edges by strips of cloth, or the equivalent thereof, so that the several sections may be either folded or unfolded as specified.

I also claim the combination, as well as the arrangement, of the series of sectional supporters $c$, and a folding shade composed of a series of trapezoids, $a$, arranged and connected or hinged together at their edges substantially in manner as specified.

HENRY M. HARTSHORN.

Witnesses:
R. H. EDDY,
F. P. HALE, Jr.